(12) United States Patent
Takagi et al.

(10) Patent No.: US 9,994,154 B1
(45) Date of Patent: Jun. 12, 2018

(54) APPARATUSES AND METHODS FOR MAKING AN OBJECT APPEAR TRANSPARENT

(71) Applicants: Toyota Jidosha Kabushiki Kaisha, Toyota-shi, Aichi-ken (JP); Toyota Motor Engineering & Manufacturing North America, Inc., Erlanger, KY (US)

(72) Inventors: Mayu Takagi, Aichi (JP); Debasish Banerjee, Ann Arbor, MI (US)

(73) Assignees: Toyota Motor Engineering & Manufacturing North America, Inc., Plano, TX (US); Toyota Jidosha Kabushiki Kaisha, Toyota-shi (JP)

( * ) Notice: Subject to any disclaimer, the term of this patent is extended or adjusted under 35 U.S.C. 154(b) by 0 days. days.

(21) Appl. No.: 15/423,170

(22) Filed: Feb. 2, 2017

Related U.S. Application Data

(60) Provisional application No. 62/432,102, filed on Dec. 9, 2016.

(51) Int. Cl.
    *G02B 27/14* (2006.01)
    *G02B 5/08* (2006.01)
    (Continued)

(52) U.S. Cl.
    CPC .............. *B60R 1/007* (2013.01); *B62D 25/04* (2013.01); *G02B 5/3083* (2013.01); *G02B 17/06* (2013.01); *G02B 27/14* (2013.01); *G02B 27/283* (2013.01)

(58) Field of Classification Search
    CPC .... G02B 27/14; G02B 27/144; G02B 27/283; G02B 27/0172; G02B 27/142
    (Continued)

(56) References Cited

U.S. PATENT DOCUMENTS

| 5,941,596 A | 8/1999 | See |
| 9,405,118 B1 * | 8/2016 | Lu .......................... G02B 27/00 |

(Continued)

FOREIGN PATENT DOCUMENTS

| CN | 103287340 A | 9/2013 |
| EP | 1836953 B1 | 6/2016 |

(Continued)

OTHER PUBLICATIONS

"Physics demonstrations: cloaking device?", Apr. 25, 2013; URL: https://skullsinthestars.com/2013/04/25/physics-demonstrations-cloaking-device.

(Continued)

*Primary Examiner* — Mohammed Hasan
(74) *Attorney, Agent, or Firm* — Dinsmore & Shohl LLP

(57) ABSTRACT

A cloaking device includes cloaking region boundary planes oriented non-planar to each other, each of the cloaking region boundary planes having an outward facing mirror surface and an inward facing opaque surface. The cloaking device includes a cloaking region bounded at least partially by the inward facing opaque surfaces of the cloaking region boundary planes. Light from an object positioned on the object-side of the cloaking device and obscured by the CR has a first optical path through the cloaking device and light from the object not obscured by the CR has a second optical path through the cloaking device. A first matching medium is positioned between the object-side and the image-side in the second optical path and increases the second optical path length such that an optical path difference between the first optical path length and the second optical path length is reduced.

20 Claims, 8 Drawing Sheets

(51) Int. Cl.
*B60R 1/00* (2006.01)
*G02B 27/28* (2006.01)
*G02B 5/30* (2006.01)
*G02B 17/06* (2006.01)
*B62D 25/04* (2006.01)

(58) Field of Classification Search
USPC ......... 359/629, 726–731, 733–735, 850, 857
See application file for complete search history.

(56) References Cited

U.S. PATENT DOCUMENTS

| | | | |
|---|---|---|---|
| 2015/0183375 A1 | 7/2015 | Wu | |
| 2015/0248013 A1 | 9/2015 | Chen et al. | |
| 2015/0296144 A1* | 10/2015 | Kline | H04N 5/23293 348/122 |
| 2016/0025956 A1* | 1/2016 | Choi | G02B 17/008 359/730 |

FOREIGN PATENT DOCUMENTS

| | | |
|---|---|---|
| WO | 2015098557 A1 | 7/2015 |
| WO | 2016104465 A1 | 6/2016 |

OTHER PUBLICATIONS

Chen, Hongsheng et al., "Ray-optics cloaking devices for large objects in incoherent natural light", Nature Communications 4, Article No. 2652 (2013), Published/Accessed: Oct. 24, 2013.

Chen, Hongsheng et al., "Broadband polygonal invisibility cloak for visible light", Scientific Reports, Feb. 9, 2012, pp. 1-4.

Howell, John C. et al., "Simple, broadband, optical spatial cloaking of very large objects", Department of Physics and Astronomy, University of Rochester, www.physics.optics, arXiv:1306.0863 </abs/1306.0863> [physics.optics], Jun. 2013.

Yang, Yihao et al., "Towards omnidirectional, large scale, full polarization, and broadband practical invisibility cloaks: challenges and progress", EPJ Appl. Metamat. 2014, 1, 7.

* cited by examiner

APPARATUSES AND METHODS FOR MAKING AN OBJECT APPEAR TRANSPARENT

CROSS REFERENCE TO RELATED APPLICATION(S)

This application claims the benefit of U.S. Provisional Application No. 62/432,102 filed Dec. 9, 2016, the entire contents of which are hereby incorporated by reference.

TECHNICAL FIELD

The present specification generally relates to apparatuses and methods for making an object appear transparent and, more specifically, to cloaking devices for pillars of vehicles and methods for making pillars of vehicles appear transparent.

BACKGROUND

Studies on cloaking devices that appear to make a pillar of a vehicle transparent have been published. Such studies disclose the use of metamaterials or the use of video cameras in combination with a display screen to allow an occupant of a vehicle to ostensibly "see" though the vehicle pillar, thereby reducing blind spots in the vehicle. However, metamaterials and video technology use complicated material designs and equipment.

Accordingly, a need exists for alternative devices that appear to make a pillar of a vehicle transparent.

SUMMARY

In one embodiment, a cloaking device for cloaking an article includes an object-side, an image-side, a cloaking region (CR) boundary plane with an outward facing mirror surface and an inward facing opaque surface and a CR is at least partially bounded by the inward facing opaque surface of the CR boundary plane. A half mirror is spaced apart and generally parallel to the outward facing mirror surface and a first matching medium is positioned between the object-side and the image-side. The cloaking device has a first optical path from an object positioned on the object-side of the cloaking device and obscured by the CR to an image of the object on the image-side, and a second optical path from the object positioned on the object-side of the cloaking device and not obscured by the CR to an image of the object on the image-side. The first optical path has a first optical path length and the second optical path has a second optical path length. The matching medium is positioned in the second optical path and alters the second optical path length such that an optical path difference between the first optical path length and the second optical path length is reduced and improved consistency between images formed from light reflected from the object obscured by the CR and images from light reflected from the object not obscured by the CR is provided.

According to another embodiment, a cloaking device for cloaking an article of a vehicle includes a cloaking assembly with an object-side, an image-side and at least two CR boundary planes located at least partially between the object-side and the image-side. The at least two CR boundary planes are positioned non-planar to each other and each of the at least two CR boundary planes having an outward facing mirror surface and an inward facing opaque surface. A CR is bounded by the inward facing opaque surfaces of the at least two CR boundary planes and a vehicle article is positioned within the CR. At least two half mirrors are positioned at least partially between the object-side and the image-side, and each of the at least two half mirrors are spaced apart and generally parallel to one of the outward facing mirror surfaces such that a half mirror is spaced apart and generally parallel to each outward facing mirror surface. At least one quarter-wave plate positioned on or adjacent to the image side may be include and at least two first matching mediums are positioned between the object-side and the image-side. The cloaking device has at least two first optical paths from an object positioned on the object-side of the cloaking device and obscured by the CR to the image of the object on the image-side, and at least two second optical paths from the object positioned on the object-side of the cloaking device and not obscured by the CR to an image of the object on the image-side. The at least two first optical paths each have a first optical path length and the at least two second optical paths each have a second optical path length. The at least two first matching mediums are positioned in the at least two second optical paths such that one of the first matching mediums is positioned in each second optical paths and increases the second optical path length of the at least two second optical paths. Light from an object located on the object-side of the cloaking assembly and obscured by the CR is redirected around the CR and forms an image of the object on the image-side of the cloaking assembly such that the vehicle article appears to be transparent. Also, the at least two matching mediums alter, e.g., reduce, an optical path difference between the first optical path length and the second optical path length thereby improving consistency between images formed from light reflected from the object obscured by the CR and images from light reflected from the object not obscured by the CR.

In embodiments, a cloaking device for cloaking an article includes an object-side, an image-side and four CR boundary planes positioned non-planar to each other. Each of the four CR boundary planes has an outward facing mirror surface and an inward facing opaque surface. A CR is bounded by the inward facing opaque surfaces of the four CR boundary planes and an article located at least partially within the CR. Four half mirrors are spaced apart and generally parallel to the outward facing mirror surfaces such that a half mirror is spaced apart and generally parallel to each outward facing mirror surface. A first matching medium is positioned between the object-side and the image-side. The cloaking device has a first optical path from an object positioned on the object-side of the cloaking device and obscured by the CR to an image of the object on the image-side, and a second optical path from the object positioned on the object-side of the cloaking device and not obscured by the CR to an image of the object on the image-side. The first optical path has a first optical path length and the second optical path has a second optical path length. Light from an object on an object-side of the cloaking device is redirected around the CR and appears as an image on an image-side of the cloaking device and is visible to an observer viewing the image-side of the cloaking device and the article within the CR is not visible to the observer viewing the image-side of the cloaking device such that the article within the CR appears transparent to the observer viewing the image-side of the cloaking device. Also, the matching medium is positioned in the second optical path and increases the second optical path length such that an optical path difference between the first optical path length and the second optical path length is altered thereby improving consistency between images formed from light reflected from the object obscured by the CR and images from light reflected from the object not obscured by the CR.

These and additional features provided by the embodiments described herein will be more fully understood in view of the following detailed description in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

A cloaking device is provided. The cloaking device may have an object-side, an image-side and a cloaking region (CR) boundary plane having an outward facing mirror surface and an inward facing opaque surface. A CR is at least partially bounded by the inward facing opaque surface of the CR boundary plane, a half mirror is spaced apart and generally parallel to the outward facing mirror surface and a matching medium is positioned between the object-side and the image-side. The half mirror may be a p-polarization half mirror or an s-polarization half mirror. In embodiments, an article, e.g. an A-pillar of a vehicle, a B-pillar of a vehicle or a C-pillar of a vehicle, is positioned within the CR and light from an object located on the object-side of the cloaking device and obscured by the CR is redirected around the CR and the article and forms the image of the object on the image-side of the cloaking device such that the article appears transparent. The cloaking device has a first optical path with a first optical path length for light from a portion of an object positioned on the object-side of the cloaking device and obscured by the CR and a second optical path with a second optical path length for light from another portion of the object not obscured by the CR. The matching medium is positioned in the second optical path and increases the second optical path length such that an optical path difference between the first optical path length and the second optical path length is altered, e.g., reduced, thereby improving consistency between images forming from light reflected from the object obscured by the CR and images from light reflected from the object not obscured by the CR.

Figure 1:
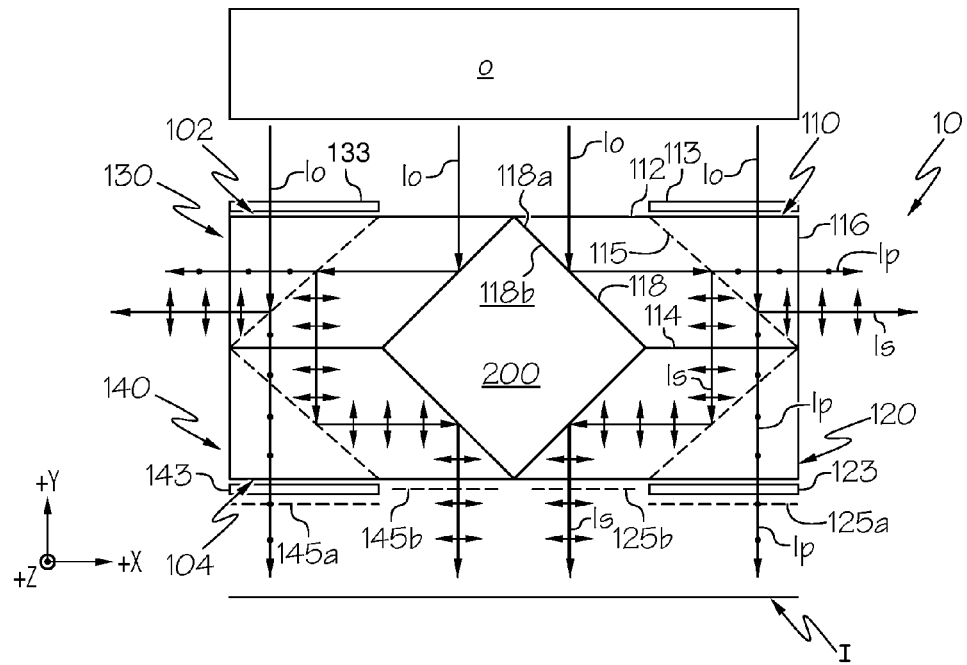
FIG. 1 schematically depicts a top view of a cloaking device according to one or more embodiments described and illustrated herein.

FIG. 1 generally depicts one embodiment of a cloaking device. The cloaking device includes a cloaking region (CR) that is at least partially bounded by at least two CR boundary planes that are non-planar to each other. Each of the two CR boundary planes has an outward facing mirror surface and an inward facing opaque surface. Spaced apart and oriented generally parallel to each of the CR boundary planes is a half mirror (e.g., a polarizing half mirror) that allows p-polarized light to pass through and s-polarized light to be reflected or, alternatively, allows s-polarized light to pass through and p-polarized light to be reflected. Referring to the coordinate system in the figure, portions of a target object are located directly behind the CR in the +Y direction (obscured portions of the object which are otherwise not visible through the CR) and portions of the target object are located outside or beyond the CR in the +Y direction (visible portions of the object). Light rays (light) from the obscured portions of the target object have a first optical path with a first optical path length through the cloaking device. Particularly, light from obscured portions of the target object travel in the −Y direction and are incident on a first outward facing mirror surface. The first outward facing mirror surface reflects the incident light from the obscured portions of the target object in the +X direction to a first half mirror that is spaced apart and oriented generally parallel to the first outward facing mirror surface. One mode of polarized light (e.g., p-polarized light) from the light reflected from the first outward facing mirror surface passes through the first half mirror (continues traveling in the +X direction), while another mode of polarized light (e.g. s-polarized light) is reflected by the first half mirror in the −Y direction. The polarized light reflected in the −Y direction by the first half mirror is reflected into the −X direction by a second half mirror. The polarized light reflected into the −X direction by the second half mirror is reflected in the −Y direction by a second outward facing mirror surface that is spaced apart and oriented generally parallel to the second half mirror. An observer looking at the cloaking device in the +Y direction will see the reflection of the polarized light by the second outward facing mirror surface, i.e. polarized light originating from light from obscured portions of the target object will be visible to a human eye located on an opposite side of the CR from the obscured portions of the target object. Also, light reflected from an article positioned within the CR (i.e., the cloaked article) is not transmitted through the inward facing opaque surfaces and is not seen by the observer looking at the cloaking device in the +Y direction. That is, the cloaking device effectively redirects light from the obscured portions of the target object around the CR such that the light from the target object appears to pass through the cloaked article giving the visual impression that the cloaked article is transparent.

Still referring to FIG. 1, light from the visible portions of the target object have a second optical path with a second optical path length through the cloaking device. Particularly, light from the visible portions of the target object travel in the −Y direction and are incident on the first half mirror. One mode of the incident light (e.g., s-polarized light) is reflected in the +X direction by the first half mirror and another mode of the incident light (e.g. p-polarized light) is transmitted through the first half mirror and continues traveling in the −Y direction. The transmitted polarized light traveling in the −Y direction reaches the second half mirror and is transmitted through the second half mirror. An observer looking at the cloaking device in the +Y direction will see the transmitted polarized light traveling in the −Y direction, i.e., polarized light originating from light from visible portions of the target object will be visible to a human eye located on an opposite side of the cloaking device from the visible portions of the target object. Accordingly, an individual will see the entire target object, both obscured portions and visible portions, that is located on the opposite side of the CR (and thus on the opposite side of a cloaked article) giving the visual impression that the cloaked article is transparent.

In embodiments, light from the visible portions of the target object is transmitted through a matching medium that increases the second optical path length such that an optical path difference between the first optical path length and the second optical path length is altered. For example, reducing the optical path difference between the first optical path length and the second optical path length improves consistency between images formed from light of the obscured portions and images formed from light of the visible portions of the target object due.

Figure 2:
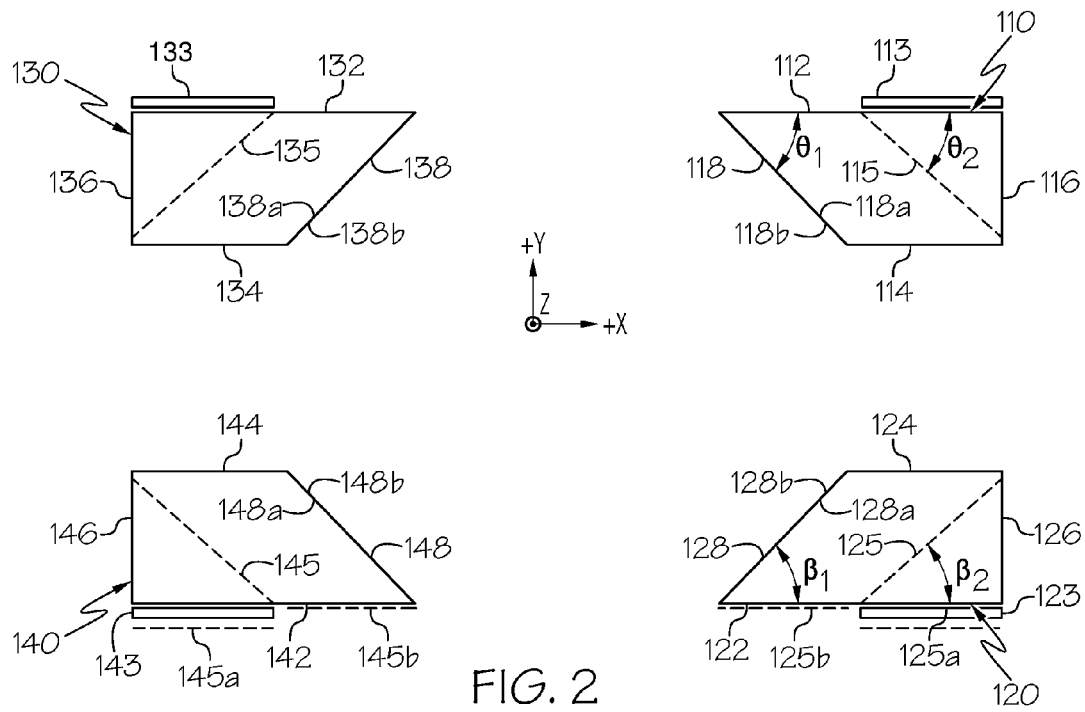
FIG. 2 schematically depicts top isolated views of four cloaking device components of the cloaking device of FIG. 1 according to one or more embodiments described and illustrated herein.

Referring now to FIGS. 1-2, embodiments of a cloaking device include a cloaking assembly 10 with four CR boundary planes 118, 128, 138, 148. The CR boundary planes 118, 128, 138, 148 located adjacent to each other are non-planar to each other. In embodiments, opposing CR boundary planes 118, 148 and 128, 138 may be oriented parallel to each other and adjacent CR boundary planes 118, 128, 138, 148 may be oriented orthogonal to adjacent CR boundary planes, e.g. CR boundary plane 118 is oriented orthogonal to adjacent CR boundary planes 138, 128, CR boundary plane 128 is oriented orthogonal to adjacent CR boundary planes 118, 148, etc. Each of the four CR boundary planes have an outward facing mirror surface 118a, 128a, 138a, 148a, respectively, and an inward facing opaque surface 118b, 128b, 138b, 148b, respectively. The outward facing mirror surfaces 118a, 128a, 138a, 148a, can be made from omni-directional photonic crystals or mirrors such that approximately 100% (+1-10%) of light incident on the outward facing mirror surfaces is reflected from the outward facing mirror surfaces. Accordingly, the term "mirror surface" used herein refers to a surface that reflects approximately 100% (+/−10%) of all modes of light (e.g. s-polarized light and p-polarized light) incident on the mirror surface. In embodiments, the CR boundary planes 118, 128, 138, 148 form a CR 200 bound at least partly by the inward facing opaque surfaces 118b, 128b, 138b, 148b. The four CR boundary planes 118, 128, 138 148, have a height 'h' (FIG. 4) in the Z direction of the coordinate axes in the figures and light reflected or transmitted within the CR 200 does not pass through the inward facing opaque surfaces 118b, 128b, 138b, 148b. Accordingly, an article (e.g., a cloaked article) located within the CR 200 is not visible to an observer viewing the cloaking assembly 10 in the +Y direction.

Still referring to FIGS. 1-2, spaced apart and oriented generally parallel (within +/−2°) to each of the four CR boundary planes 118, 128, 138 148, are half mirrors 115, 125, 135, 145, respectively. The half-mirrors 115, 125, 135, 145 reflect a specific mode of visible light. Specifically, each of the half mirrors 115, 125, 135, 145, can be an s-polarizer half mirror or a p-polarizer half mirror. The half mirrors 115, 125, 135, 145, can be in the form of a diffraction grating or thin film polarizer that reflects the s-mode of visible light and allows the p-mode of visible light to pass through (a p-polarization diffraction grating or thin film), or in the alternative, reflects the p-mode of visible light and allows the s-mode of the visible light to pass through (an s-polarization diffraction grating or thin film). It should be appreciated that the half mirrors 115, 125 are both s-polarizer half mirrors or p-polarizer half mirrors and the half mirrors 135, 145 are both s-polarizer half mirrors or p-polarizer half mirrors, i.e. the half mirrors 115, 125 may be s-polarizer mirrors and the half mirrors 135, 145 may be p-polarizer half mirrors; the half mirrors 115, 125 may be p-polarizer mirrors and the half mirrors 135, 145 may be s-polarizer half mirrors; or all of the half mirrors 115, 125, 135, 145 may be s-polarizer half mirrors or p-polarizer half mirrors.

The four CR boundary planes 118, 128, 138 148, and the corresponding half mirrors 115, 125, 135, 145, may be part of four cloaking assembly components 110, 120, 130, 140, respectively. Each cloaking assembly component 110, 120, 130, 140, has an outward facing surface 112, 122, 132, 142, respectively, an inward facing surface 114, 124, 134, 144, respectively, an outer end surface 116, 126, 136, 146, respectively, and an inner side surface defined by the inward facing opaque surface 118b, 128b, 138b, 148b, respectively. The outward facing surfaces 112, 132 form an object-side 102 of the cloaking device and the outward facing surfaces 122, 142 form an image-side 104 of the cloaking device.

In embodiments, a matching medium 113 may be positioned adjacent the outward facing surface 112, and in the alternative or in addition to, a matching medium 133 may be positioned adjacent the outward facing surface 132. The matching medium 113 may be positioned directly behind (+Y direction) the half mirror 115, i.e., the matching medium 113 may not extend beyond the half mirror 115 in the −X direction depicted in the figures. The matching medium 133 may be positioned directly behind (+Y direction) the half mirror 135, i.e., the matching medium 133 may not extend beyond the half mirror 135 in the +X direction depicted in the figures. In other embodiments, a matching medium 123 may be positioned adjacent the outward facing surface 122, and in the alternative or in addition to, a matching medium 143 may be positioned adjacent the outward facing surface 142. The matching medium 123 may be positioned directly in front of (−Y direction) the half mirror 125, i.e., the matching medium 123 may not extend beyond the half mirror 125 in the −X direction depicted in the figures. The matching medium 143 may be positioned directly in front of (−Y direction) the half mirror 145, i.e., the matching medium 143 may not extend beyond the half mirror 145 in the +X direction depicted in the figures. In still other embodiments, the matching medium 113 may be positioned adjacent the outward facing surface 112, and in the alternative or in addition to, the matching medium 133 may be positioned adjacent the outward facing surface 132, and the matching medium 123 may be positioned adjacent the outward facing surface 122, and in the alternative or in addition to, the matching medium 143 may be positioned adjacent the outward facing surface 142.

Still referring to FIGS. 1-2, one or more quarter-wave plates 125a, 125b may be positioned on or adjacent to the outward facing surface 122 and one or more quarter-wave plates 145a, 145b may be positioned on or adjacent to the outward facing surface 142. The quarter-wave plate 125a is positioned to the right (+X direction) of the half-mirror 125, the quarter-wave plate 125b is positioned to the left (−X direction) of the half-mirror 125, the quarter-wave plate 145a is positioned to the left (−X direction) of the half-mirror 145, and the quarter-wave plate 145b is positioned to the right (+X direction) of the half-mirror 145. The one or more quarter-wave plates 125a, 125b, 145a, 145b, also known as optical retarders, convert linearly polarized light into circularly polarized light, circularly polarized light into linearly polarized light, or a particular mode of linearly polarized light into a different mode of linearly polarized light, e.g., p-polarized light into s-polarized light or s-polarized light into p-polarized light.

The CR boundary planes 118, 138, are oriented at an angle $\theta_1$ relative to the outward facing surfaces 112, 132, respectively, and the CR boundary planes 128, 148 are oriented at an angle $\beta_1$ relative to the outward facing surfaces 122, 142, respectively. In embodiments, the angle $\theta_1$ is equal to the angle $\beta_1$. In other embodiments, the angle $\theta_1$ is not equal to the angle $\beta_1$. The half mirrors 115, 135, are oriented at an angle $\theta_2$ relative to the outward facing surfaces 112, 132, respectively, and the half mirrors 125, 145 are oriented at an angle $\beta_2$ relative to the outward facing surfaces 122, 142, respectively. In embodiments, the angle $\theta_2$ is equal to the angle $\beta_2$. In other embodiments, the angle $\theta_2$ is not equal to the angle $\beta_2$. In embodiments, the angle $\theta_1$ is equal to the angle $\theta_2$ and the angle $\beta_1$ is equal to the angle $\beta_2$. For example, $\theta_1$ and $\theta_2$ can be generally equal to 45° (+/−1°), and $\beta_1$ and $\beta_2$ can be generally equal to 45° (+/−1°).

The four cloaking assembly components 110, 120, 130, 140, are transparent to incident light (both polarized and unpolarized) except for the half mirrors 115, 125, 135, 145, the outward facing mirror surfaces 118a, 128a, 138a, 148a, the inward facing opaque surfaces 118b, 128b, 138b, 148b, and optionally the outer end surfaces 116, 126, 136, 146. The four cloaking assembly components 110, 120, 130, 140, can be made from any suitable transparent material, for example a transparent glass or a transparent plastic. In the alternative, the four cloaking assembly components 110, 120, 130, 140, can be a structure, e.g. a frame, that holds the four CR boundary planes 118, 128, 138, 148, and the four half mirrors 115, 125, 135, 145 in a desired orientation relative to each other with air or another gas present between the four CR boundary planes 118, 128, 138, 148, and the four half mirrors 115, 125, 135, 145. The frame may be a plurality of transparent glass or transparent plastic panes that hold the four CR boundary planes 118, 128, 138, 148, and the four half mirrors 115, 125, 135, 145 in a desired orientation relative to each other with air or another gas present between the four CR boundary planes 118, 128, 138, 148, and the four half mirrors 115, 125, 135, 145. In embodiments, transparent glass or transparent plastic panes form the outward facing surfaces 112, 122, 132, 142, inward facing surfaces 114, 124, 134, 144, and outer end surfaces 116, 126, 136, 146, and hold the four CR boundary planes 118, 128, 138, 148, and the four half mirrors 115, 125, 135, 145 in a desired orientation relative to each other with air or another gas present between the four CR boundary planes 118, 128, 138, 148, and the four half mirrors 115, 125, 135, 145.

The outer end surfaces 116, 126, 136, 146, may be transparent, have an absorber layer disposed thereon or be a half-mirror. In embodiments, the outer end surfaces 116, 126, 136, 146, are transparent. In other embodiments, the outer end surfaces 116, 126, 136, 146, have an absorber layer disposed thereon that absorbs incident light from within the four cloaking assembly components 110, 120, 130, 140, and/or from outside the four cloaking assembly components 110, 120, 130, 140. The absorber layer may be made from any suitable material that absorbs approximately 90% (+/−10%) of incident light, illustratively including dark colored surfaces made of glass, polymers, metals, ceramics, composites, etc. In other embodiments, the outer end surfaces 116, 126, 136, 146, are half-mirrors such that one mode of incident light is reflected (e.g., s-polarized light or p-polarized light) and another mode of incident light is transmitted through the half mirror (e.g., p-polarized light or s-polarized light, respectively). In other embodiments, one or more of the outer end surfaces 116, 126, 136, 146, is transparent and one or more of the outer end surfaces 116, 126, 136, 146, has an absorber layer disposed thereon. In other embodiments, one or more outer end surfaces 116, 126, 136, 146, is transparent and one or more of the outer end surfaces 116, 126, 136, 146, is a half mirror. In other embodiments, one or more of the outer end surfaces 116, 126, 136, 146, has an absorber layer disposed thereon and one or more of the outer end surfaces 116, 126, 136, 146, is a half mirror. In other embodiments, one or more of the outer end surfaces 116, 126, 136, 146, is transparent, one or more of the outer end surfaces 116, 126, 136, 146, has an absorber layer disposed thereon, and one or more of the outer end surfaces 116, 126, 136, 146, is a half mirror.

While FIGS. 1-2 illustrate four cloaking assembly components 110, 120, 130, 140, it should be appreciated that the four CR boundary planes 118, 128, 138, 148, and the four half mirrors 115, 125, 135, 145 can be contained within any number of cloaking assembly components. For example, in embodiments, the cloaking assembly components 110 and 120 may be a single cloaking assembly component with no inward facing surface 114, 124, between the outward facing surfaces 112, 122, and the cloaking assembly components 130 and 140 may be a single cloaking assembly component with no inward facing surface 134, 144, between the outward facing surfaces 132, 142. In other embodiments, the cloaking assembly components 110 and 130 may be a single cloaking assembly component and the two cloaking assembly components 120 and 140 can be a single cloaking assembly component. In other embodiments, three of the four cloaking assembly components 110, 120, 130, 140 may be a single cloaking assembly component assembled with a remaining one of the cloaking assembly components 110, 120, 130, 140. For example, the three cloaking assembly components 110, 120, 130 may be a single cloaking assembly component assembled with the remaining cloaking assembly component 140. In other embodiments, the four cloaking assembly components 110, 120, 130, 140 may be a single cloaking assembly component.

Still referring to FIGS. 1-2, light 'lo' is reflected from a target object 'O' located on the object-side 102 of the cloaking device, travels in the −Y direction, and is incident on and transmitted through the outward facing surfaces 112, 132. The light lo reflected from the obscured portions of the object 'O' located directly behind the CR in the +Y direction is directed around the CR and has a first optical path with a first optical path length. Particularly, light lo reflected from the obscured portions of the target object 'O' is reflected by the outward facing mirror surfaces 118a, 138a in the +X and −X directions, respectively. The light lo reflected in the +X and −X directions is incident on the half mirrors 115, 135 respectively. As illustrated in FIG. 1, the half mirrors 115, 135 are p-polarization half mirrors that reflect the s-mode (ls) of the light lo and allow the p-mode (lp) of the light lo to pass through. The s-polarized light ls reflected from the half mirrors 115, 135 in the −Y direction is incident on the half mirrors 125, 145, respectively. The half mirrors 125, 145 are also p-polarization mirrors that reflect the s-polarized light ls traveling in the −Y direction into the −X and +X directions, respectively. The s-polarized light ls reflected in the −X and +X directions is incident on the outward facing mirror surfaces 128a, 148a, respectively, and the outward facing mirror surfaces 128a, 148a reflect the incident s-polarized light ls into the −Y direction. The s-polarized light reflected into the −Y direction by the outward facing mirror surfaces 128a, 148a, forms an image of the obscured portion of the target object located directly above the CR 200 in the +Y direction that is visible to an observer viewing the image-side 104 of the cloaking assembly 10. In embodiments, the quarter-wave plate 125b, the quarter-wave plate 145b, or both quarter-wave plates 125b, 145b may be positioned on or adjacent to the outward facing surfaces 122, 142, respectively, as described above. The quarter-wave plate 125b and the quarter-wave plate 145b convert the s-polarized light reflected into the −Y direction by the outward facing mirror surfaces 128a, 148a into p-polarized light (not shown) or circularly polarized light (not shown) before forming the image of the obscured portion of the target object located directly above the CR 200 in the +Y direction.

A portion of light lo reflected from the visible portions of the target object 'O' not located directly behind the CR in the +Y direction that forms a portion of the image I propagates directly through the cloaking assembly 10, i.e., is not directed around the CR 200, and has a second optical path with a second optical path length. Particularly, light lo reflected from the visible portions of the target object 'O' is incident on and transmitted through the outward facing surfaces 112, 132. The transmitted light lo is incident on the p-polarization half mirrors 115, 135. The half mirrors 115, 135 reflect the s-mode ls of the incident light lo in the +X and −X directions, respectively, and transmit the p-mode lp of the incident light lo in the −Y direction. The p-polarized light lp transmitted through the half mirrors 115, 135 is incident on and transmitted through the p-polarization half mirrors 125, 145, respectively, in the −Y direction. The p-polarized light lp transmitted in the −Y direction by the half mirrors 125, 145 forms an image of the visible portions of the target object 'O' not located directly behind the CR 200 in the +Y direction that is visible to an observer viewing the cloaking assembly in the +Y direction. In embodiments, the quarter-wave plate 125a, the quarter-wave plate 145a, or both quarter-wave plates 125a, 145a may be positioned on or adjacent to the outward facing surfaces 122, 142, respectively, as described above. The quarter-wave plate 125a and the quarter-wave plate 145a convert the p-polarized light transmitted into the −Y direction by the half mirrors 125, 145 into s-polarized light (not shown) or circularly polarized light (not shown) before forming the image of the visible portions of the target object 'O' not located behind above the CR 200 in the +Y direction. Accordingly, an image 'I' of the entire target object 'O' (both obscured portions and visible portions) is visible to the observer viewing the image-side 104 of the cloaking assembly 10.

Images formed by light lo from the obscured portions of the target object 'O' with the first optical path length may be inconsistent or distorted compared with images formed by light lo from light lo from the visible portions of the target object 'O' since the second optical length is less than the first optical path length. Particularly, with the first light path being directed around the CR 200 and the second light path being directly through the cloaking assembly 10, i.e., not directed around the CR 200, the second light path length is less than the first light path length. Not being bound by theory, an optical path length for an optical path is the product of the geometric length of the path that light follows through the cloaking assembly 10 and the refractive index of the medium through which the light propagates. A difference in optical path length between two optical paths may be referred to as the optical path difference. Without matching mediums 113, 123, 133, 143, the optical path difference between the first optical path length (light lo from the obscured portions of the target object 'O') and the second optical path length (light lo from the visible portions of the target object 'O') may be expressed as:

$$P2-P1=2rn \tag{1}$$

where P1 is the first optical path length, P2 is the second optical path length, 'r' is the lateral distance (X direction) between the outward facing mirror surfaces 118a, 128a, 138a, 148a and respective half mirrors 115, 125, 135, 145, and 'n' is the refractive index of the medium of the cloaking assembly components 110, 120, 130, 140 through which the light lo, ls and lp pass through. Positioning a matching medium, e.g., at least one of matching medium 113, 123, 133, 143 in the second optical path increases the second optical length by 'iat' where 'i' is the number of matching mediums positioned in the second optical path, 'a' is the refractive index of the matching medium and T is the thickness of the matching medium. Accordingly, the optical path difference with two matching mediums (i=2) in the second optical path may be expressed as:

$$(P2+2at)-P1=2rn \tag{2}$$

which may be rearranged as:

$$P1-P2=2rn-2at \tag{3}$$

For a perfect condition, i.e., for no image inconsistency:

$$P1-P2=0 \tag{4}$$

or:

$$t=r(n/a) \tag{5}$$

and:

$$a=(r/t)n \tag{6}$$

Accordingly, expressions (1)-(6) assist in the selection of materials and thicknesses for matching mediums 113, 123, 133, 143. For example and without limitation, assuming the cloaking assembly components 110, 120, 130, 140 are made of glass with n=1.5 and the lateral distance r between the outward facing mirror surfaces 118a, 128a, 138a, 148a and respective half mirrors 115, 125, 135, 145 is 10 millimeters (mm), then:

$$a = 10/t \times 1.5 = 15/t \quad (7)$$

and the thickness T for a matching medium with a given refractive index 'a' may be calculated. In embodiments, the matching medium is a film, plate, sheet, etc., generally transparent to incident light (both polarized and unpolarized) and formed from a dielectric material illustratively including without limitation the dielectric materials listed in Table 1 below. For example, if the matching medium is formed from $TiO_2$ (vacuum deposited) with a refractive index of about 2.43 (a=2.43), then 't' is about 6.17 mm. Accordingly, a single $TiO_2$ matching medium having a thickness of about 6.17 mm or a pair of $TiO_2$ matching mediums each having a thickness of about 3.08 mm positioned in the second optical path reduces the optical path difference between the first optical path length and the second optical path length to about zero.

TABLE 1

Refractive Index Materials (visible region)

| Material | Refractive Index |
|---|---|
| Gallium Antimonite (GaSb) | 4.5-5.0 |
| Indium Arsenide (InAs) | 4.0 |
| Indium Phosphate (InP) | 3.5 |
| Gallium Arsenate (GaAs) | 3.53 |
| Gallium Phosphate (GaP) | 3.31 |
| Arsenic Selenide ($As_2Se_3$) | 2.8 |
| $CuAlSe_2$ | 2.75 |
| Zinc Selenide (ZnSe) | 2.5-2.6 |
| Titanium Dioxide ($TiO_2$) - solgel | 2.36 |
| Alumina Oxide ($Al_2O_3$) | 1.75 |
| Yttrium Oxide ($Y_2O_3$) | 1.75 |
| Niobium Pentoxide ($Nb_2O_5$) | 2.4 |
| Zirconium Oxide ($ZrO_2$) | 2.36 |
| Chalcogenide glass | 2.6 |
| Cerium Oxide ($CeO_2$) | 2.53 |
| Gallium Nitride (GaN) | 2.5 |
| Niobium Oxide ($Nb_2O_3$) | 2.4 |
| Zinc Telluride (ZnTe) | 3.0 |
| Chalcogenide glass + Ag | 3.0 |
| Zinc Sulfide (ZnS) | 2.5-3.0 |
| Titanium Dioxide ($TiO_2$) - vacuum deposited | 2.43 |
| Hafnium Oxide ($HfO_2$) | 2.0 |
| Niobium Oxide ($Nb_2O_5$) | 2.1 |
| Silicon Nitride (SiN) | 2.1 |
| Mica | 1.56 |
| Hafnium Oxide ($HfO_2$) | 1.9-2.0 |

At least one matching medium formed from a dielectric material, having a thickness T and positioned in the second optical path may reduce the optical path difference between the first optical path length and the second optical path length to less than about 5 mm. In embodiments, the at least one matching medium positioned in the second optical path reduces the optical path difference to less than about 3 mm. In other embodiments, the at least one matching medium positioned in the second optical path reduces the optical path difference to less than about 1 mm.

While half mirrors 115, 125, 135, 145 are described herein as p-polarization half mirrors, it should be appreciated that half mirrors 115, 125, 135, 145 can be s-polarization half mirrors and the reflected and transmitted portions of the reflected light lo discussed above will be reversed. However, the human eye cannot distinguish between s-polarized light, p-polarized light or circularly polarized light and the image T of the entire object 'O' will be visible to the human eye when an observer is viewing the image-side 104 of the cloaking assembly 10. Also, it should be appreciated that the one or more of quarter-wave plates 125a, 125b, 145a, 145b may be positioned on or adjacent to outward facing surfaces 122, 142 as described above such that only p-polarized light forms the image 'I', only s-polarized light forms the image 'I', only circularly polarized light forms the image 'I', only p-polarized light and circularly polarized light form the image 'I' or only s-polarized light and circularly polarized light form the image 'I'. Such manipulation of the polarized light reflected into the −Y direction by the outward facing mirror surfaces 128a, 128a and the polarized light transmitted in the −Y direction by the half mirrors 125, 145 may assist an observer wearing polarized sunglasses in viewing the image-side 104 of the cloaking assembly 10. Particularly, the one or more quarter-wave plates 125a, 125b, 145a, 145b ensure that polarized sunglasses that block p-polarized light or s-polarized light do not prevent an observer wearing such polarized sunglasses from seeing the entire target object 'O when viewing the image-side 104 of the cloaking assembly 10.

Figure 3:
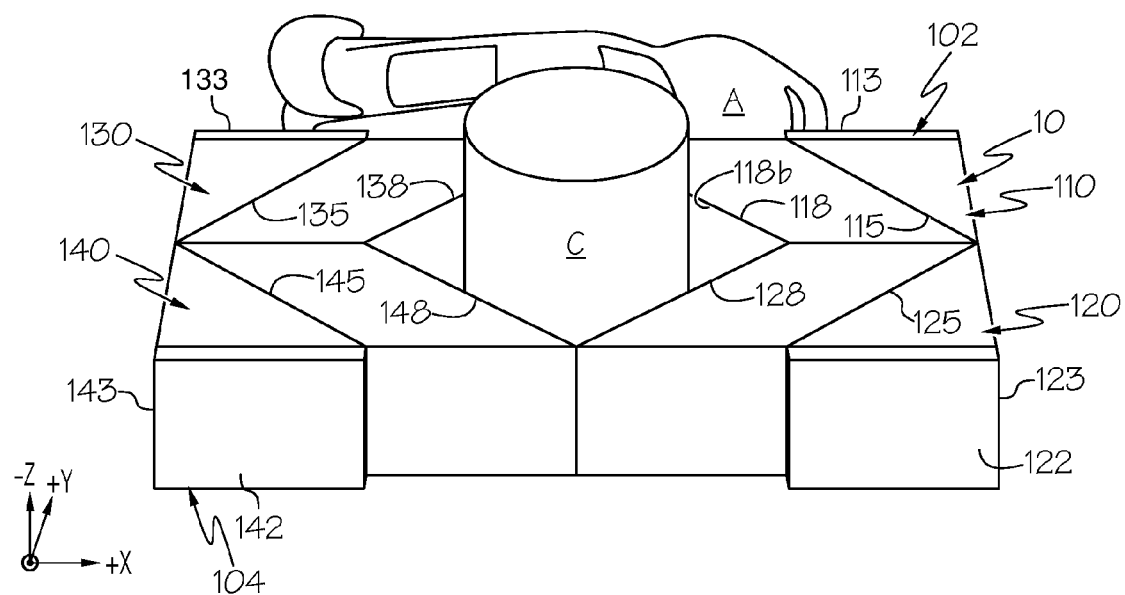
FIG. 3 schematically depicts a top perspective view of the cloaking device of FIG. 1 with a first object on one side of the cloaking device and a second object within a cloaking region (CR) of the cloaking device.
Figure 4:
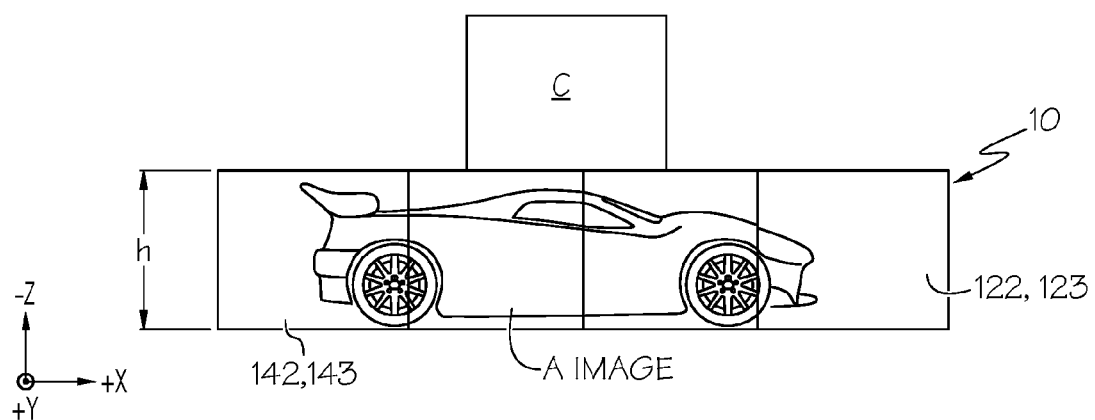
FIG. 4 schematically depicts a side view of the cloaking device of FIG. 3 with the first object on one side of the cloaking device and the second object within the CR of the cloaking device.

Referring now to FIGS. 1-4, a top perspective view and a side view of a cloaking device according to embodiments (as discussed with respect to FIGS. 1-2) are shown in FIGS. 3-4, respectively. Specifically, FIG. 3 is a top perspective view of an article in the form of a column 'C' within the CR 200 of the cloaking assembly 10 and an automobile 'A' located behind the column C on the object-side 102 of the cloaking assembly 10 in the +Y direction. The column C has a height dimension in the Z direction (increasing height in the −Z direction) greater than the height h of the cloaking device. FIG. 4 is a side view from the +Y direction of the cloaking assembly 10 shown in FIG. 3 and shows the portion of the column C that is within the CR 200 is not visible and the automobile A located behind the column C in the +Y direction is visible to an observer viewing the cloaking assembly 10 in the +Y direction. Accordingly, the column C positioned within the CR 200 is not visible to an observer viewing the image-side 104 of the cloaking assembly 10 and an image of the entire automobile A (both the obscured portion and the visible portions) is visible to the observer viewing the image-side 104. The matching mediums 113, 123, 133, 143 reduce the optical path difference between the first optical path length and the second optical path length thereby resulting in improved consistency between images formed from light reflected from the obscured portions of the automobile A and images formed from light reflected from the visible portions of the automobile A. Although column C in FIGS. 3-4 is separate from the CR boundary planes 118, 128, 138, 148, i.e., column C is a separate object from the cloaking assembly 10, it should be appreciated that column C may be structurally part of the cloaking assembly 10 and have an outer surface that provides or is equivalent to the CR boundary planes 118, 128, 138, 148 with outward facing mirror surfaces 118a, 128a, 138a, 148a, respectively.

Figure 5:
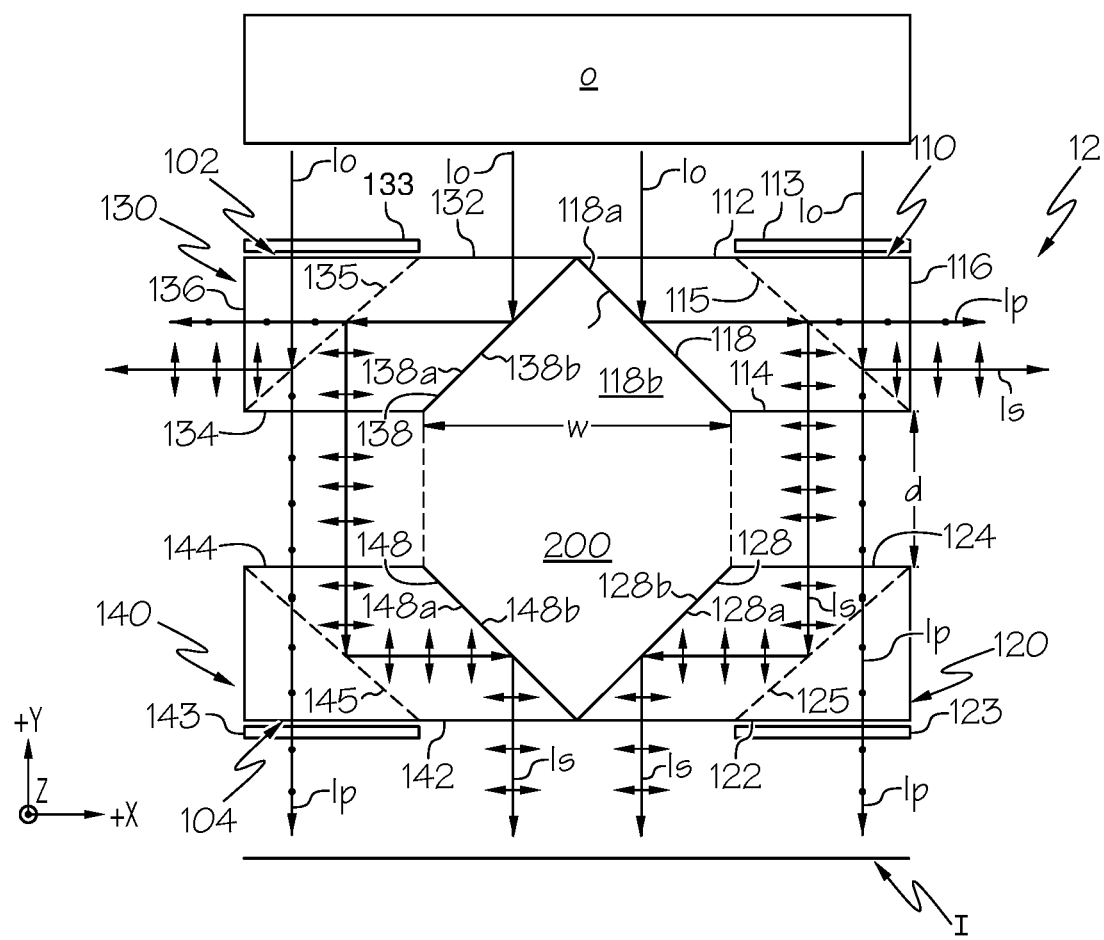
FIG. 5 schematically depicts a top view of a cloaking device according to one or more embodiments described and illustrated herein.

Referring now to FIGS. 1-5, FIG. 5 shows embodiments of a cloaking assembly 12 with an enlarged CR 200. Particularly, the cloaking assembly components 110, 120, 130, 140 are arranged such that the cloaking assembly components 110, 130 are spaced apart in the Y direction from the cloaking assembly components 120, 140, and a distance 'd' is between the inward facing surfaces 114, 124, and between the inward facing surfaces 134, 144. The area of the CR 200 in the X-Y plane is increased by the width 'w' times the distance d (w×d). The volume of the CR 200 is increased by the width w times the distance d times the height h (FIG. 4) of the CR 200 (w×d×h). While FIG. 5 illustrates four cloaking assembly components 110, 120, 130, 140, it should be appreciated that the four CR boundary planes 118, 128, 138, 148, and the four half mirrors 115, 125, 135, 145 can be contained within any number of cloaking assembly components. For example, in embodiments, the cloaking assembly components 110 and 130 may be a single cloaking assembly component and the two cloaking assembly components 120 and 140 can be a single cloaking assembly component.

As shown in the FIG. 5, light lo is reflected from the target object 'O', travels in the −Y direction and is incident on and transmitted through the outward facing surfaces 112, 132. Light lo reflected from the obscured portions of the object located directly behind the CR in the +Y direction has a first optical path. Particularly, light lo reflect from the obscured portions of the target object 'O' is reflected by the outward facing mirror surfaces 118a, 138a in the +X and −X direction, respectively. The reflected light lo in the +X and −X directions is incident on the half mirrors 115, 135 respectively. The half mirrors 115, 135 are p-polarization half mirrors and reflect the s-mode ls of the light lo and transmit the p-mode lp of the light lo. The s-polarized light is reflected by the half mirrors 115, 135 in the −Y direction is incident on the half mirrors 125, 145, respectively. The half mirrors 125, 145 are also p-polarization mirrors that reflect the s-polarized light ls traveling in the −Y direction into the −X and +X directions, respectively. The s-polarized light ls traveling in the −X and +X directions is incident on the outward facing mirror surfaces 128a, 148a, respectively, and the outward facing mirror surfaces 128a, 148a reflect the incident s-polarized light ls in the −Y direction. The s-polarized light reflected in the −Y direction by the outward facing mirror surfaces 128a, 148a, forms an image of the obscured portion of the object located behind the CR 200 in the +Y direction that is visible to an observer viewing the image-side 104 of the cloaking assembly 12. Light lo reflected from the visible portions of the target object 'O' not located behind the CR 200 in the +Y direction has a second optical path. Particularly, light lo reflected from the visible portions of the target object 'O' is incident on and transmitted through the outward facing surfaces 112, 132. The transmitted light lo is incident on the p-polarization half mirrors 115, 135, and the half mirrors 115, 135 reflect the s-mode ls of the incident light lo in the +X and −X directions, respectively, and transmit the p-mode lp of the incident light lo in the −Y direction. The p-polarized light lp transmitted through the half mirrors 115, 135 in the −Y direction is incident on and transmitted through the p-polarization half mirrors 125, 145, respectively, in the −Y direction. The p-polarized light lp transmitted in the −Y direction through the half mirrors 125, 145, forms an image of the visible portions of the target object O not located behind the CR 200 in the +Y direction that is visible to an observer viewing the image side 104 of the cloaking assembly 12. Accordingly, an image I of the entire target object O (both the obscured portion and the visible portions) is visible to an observer viewing the image-side 104 of the cloaking assembly 12.

Similar to the cloaking assembly 10 discussed above, images formed by light lo from the obscured portions of the target object 'O' with the first optical path length though the cloaking assembly 12 may be inconsistent or distorted compared with images formed by light lo from light lo from the visible portions of the target object 'O' with the second optical length through the cloaking assembly 12. That is, without the matching mediums 113, 133 and/or matching mediums 123, 143 positioned in the second optical path the first optical path length is greater than the second optical path length. Accordingly one or more of the matching mediums 113, 123, 133, 143 may be positioned in the second optical path to increase the second optical path length such that the optical path difference between the first optical path length and the second optical path length is reduced and inconsistency of the image I visible to an observer viewing the image-side 104 of the cloaking assembly 12 is reduced.

It should be appreciated that half mirrors 115, 125, 135, 145, can be s-polarization half mirrors and the reflected and transmitted portions of the reflected light lo discussed above will be reversed. Also, it should be appreciated that the one or more of quarter-wave plates 125a, 125b, 145a, 145b may be included. However, the human eye cannot distinguish between s-polarized light, p-polarized light or circularly polarized light and the image I of the entire object O will be visible to an observer viewing the image-side 104 of the cloaking assembly 12.

Figure 6:
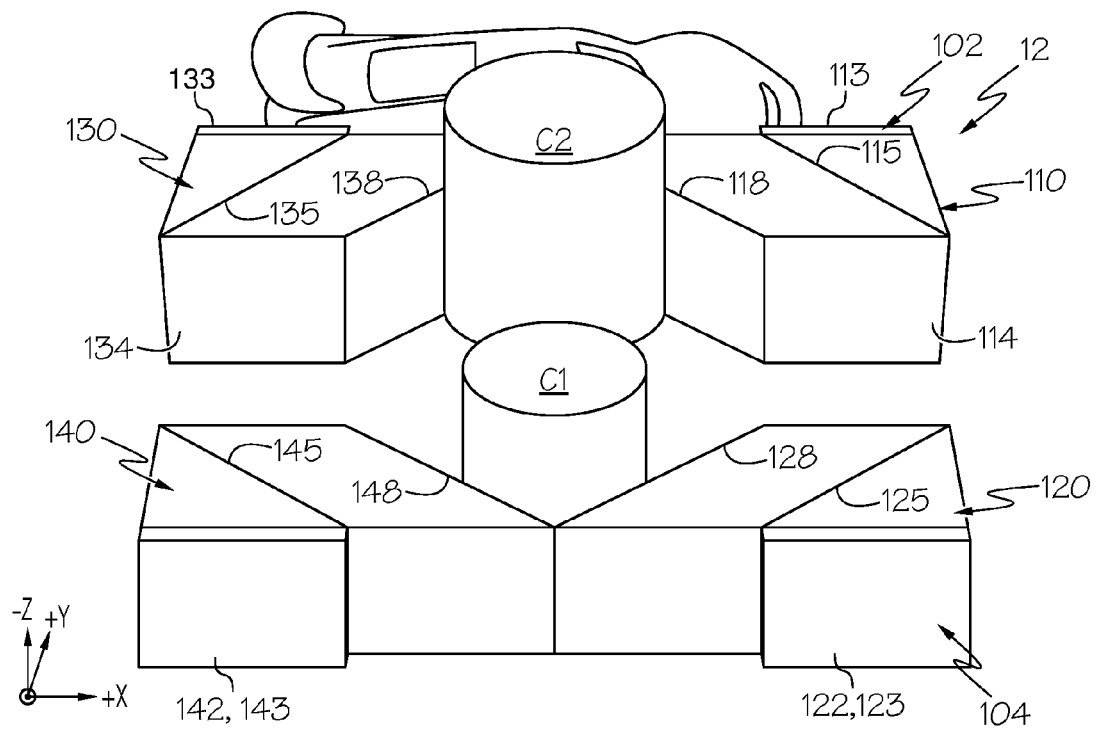
FIG. 6 schematically depicts a top perspective view of the cloaking device of FIG. 5 with a first object on one side of the cloaking device and a second object and a third object within a CR of the cloaking device.
Figure 7:
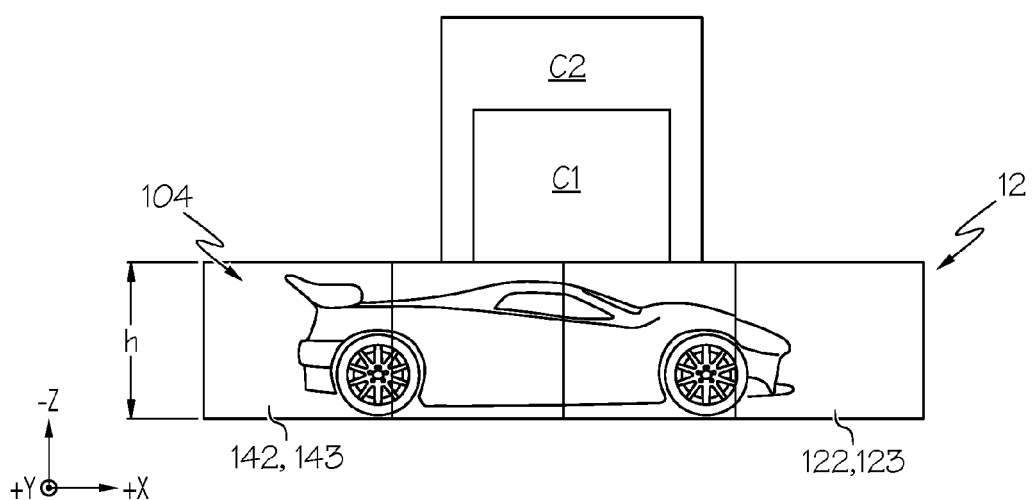
FIG. 7 schematically depicts a side view of the cloaking device of FIG. 6 with the first object on one side of the cloaking device and the second object and the third object within the CR of the cloaking device.

Referring now to FIGS. 1-7, a top perspective view and a side view of a cloaking device according to embodiments (as discussed with respect to FIG. 5) are shown in FIGS. 6-7, respectively. Specifically, FIG. 6 is a top perspective view of a first article in the form of a column 'C1' and a second article in the form of a column 'C2' within the CR 200 of the cloaking assembly 12 and the automobile 'A' located behind the columns C1, C2 on the object-side 102 of the cloaking assembly 12 in the +Y direction. The column C1 has a first height dimension in the Z direction and the column C2 has a second height dimension that is greater (in the −Z direction) than the first height dimension of column C1. The first height dimension of column C1 and the second height dimension of column C2 are both greater than the height h of the cloaking assembly 12. FIG. 7 is a side view from the +Y direction of the cloaking assembly 12 shown in FIG. 6 and shows the image-side 104. Portions of column C1 and column C2 within the CR 200 are not visible and automobile A located behind column C1 and column C2 in the +Y direction is visible to an observer viewing the image-side 104 of the cloaking assembly 12. The matching mediums 113, 123, 133, 143 reduce the optical path difference between the first optical path length and the second optical path length thereby resulting in improved consistency between images formed from light reflected from the obscured portions of the automobile A and images formed from light reflected from the visible portions of the automobile A. Although columns C1, C2 in FIGS. 6-7 are separate from the CR boundary planes 118, 128, 138, 148, i.e., columns C1, C2 are separate objects from the cloaking assembly 12, it should be appreciated that columns C1, C2 may be structurally part of the cloaking assembly 12 and have an outer surface that provides or is equivalent to the CR boundary planes 118, 128, 138, 148 with outward facing mirror surfaces 118a, 128a, 138a, 148a, respectively.

Figure 8:
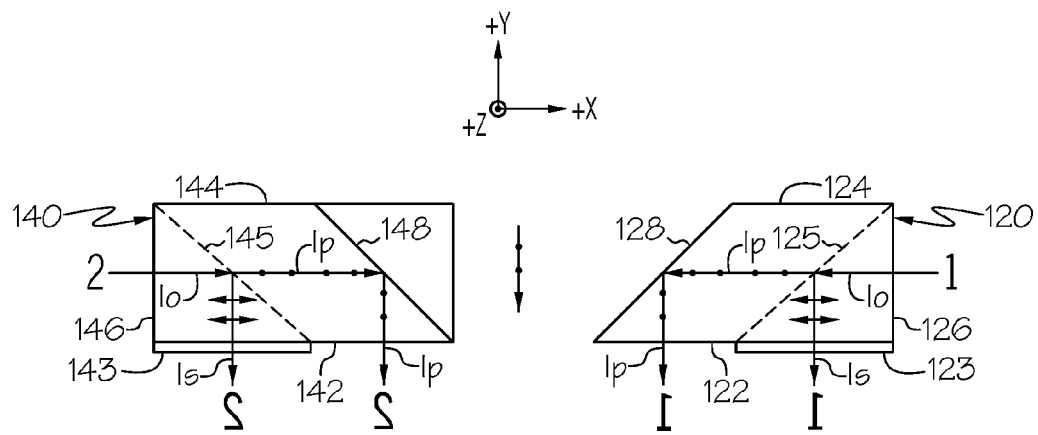
FIG. 8 schematically depicts a top isolated view of two cloaking device components according to one or more embodiments described and illustrated herein.

Referring to FIG. 8, embodiments of a cloaking device that can display additional images in conjunction with the images depicted in FIGS. 1, 4, 5 and 7 are shown. Particularly, FIG. 8 shows an item in the form of the number '1' (item 1) and an item in the form of the number '2' (item 2)

located adjacent to the outer end surfaces 126, 146, respectively, in the +X, −X directions, respectively. Light lo reflected from item 1 and item 2 is incident on and transmitted through the outer end surfaces 126, 146 in the −X, +X directions, respectively. The light lo transmitted through the outer end surfaces 126, 146 is incident on the half mirrors 125, 145, respectively. The half mirrors 125, 145 (p-polarization half mirrors) transmit the p-mode lp of the light lo in the −X, +X directions, respectively, and reflect the s-mode ls of the light lo into the −Y direction. The transmitted p-polarized light lp in the −X, +X directions is incident on the outward facing mirror surfaces 128a, 148a, respectively. The outward facing mirror surfaces 128a, 148a, reflect the incident p-polarized light lp into the −Y direction. The s-polarized light is reflected by the half mirror 125 in the −Y direction forms a reversed '1' image on the right hand side of the outward facing surface 122 and the s-polarized light ls reflected by the half mirror 145 in the −Y direction forms a reversed '2' image on the left hand side of the outer facing surface 142. The p-polarized light lp reflected by the outward facing mirror surface 128a into the −Y direction forms a reversed'1' image on the left hand side of the outward facing surface 122 and the p-polarized light lp reflected by the outward facing mirror surface 148a into the −Y direction forms a reversed '2' image on the right hand side of the outer facing surface 142. It should be appreciated that the display of additional images as depicted in FIG. 8 in conjunction with images as depicted in FIGS. 1, 4, 5 and 7 can be used as part of a heads-up display, a warning system (signal) that an object is located on the object side of the cloaking device, etc.

Figure 9:
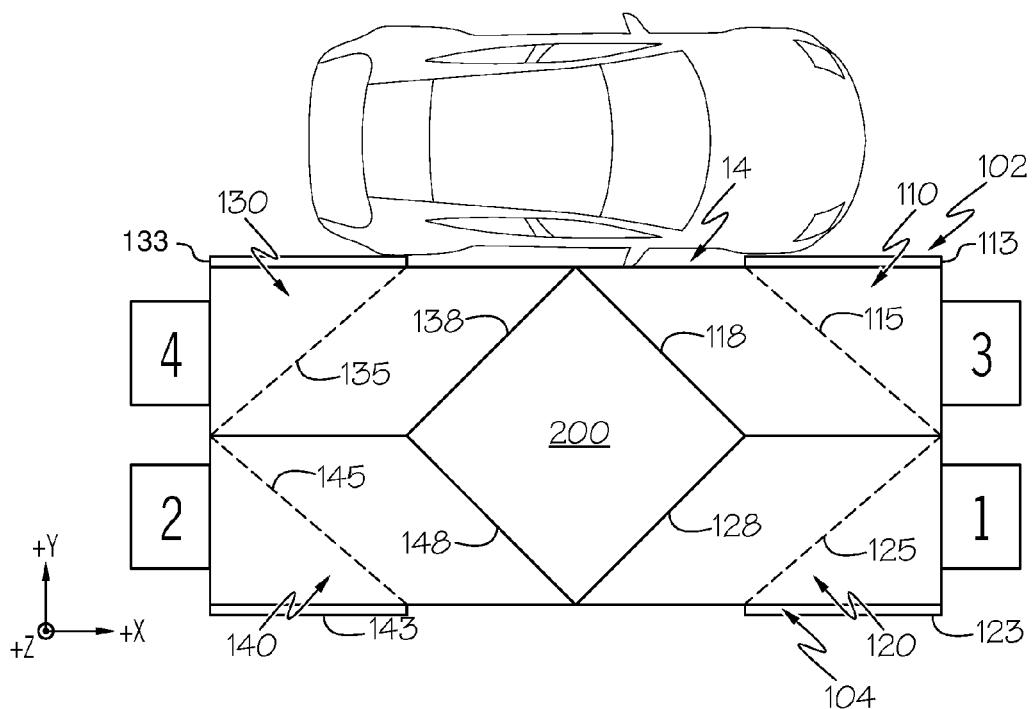
FIG. 9 schematically depicts a top view of a cloaking device with four cloaking device components according to one or more embodiments described and illustrated herein.
Figure 10:
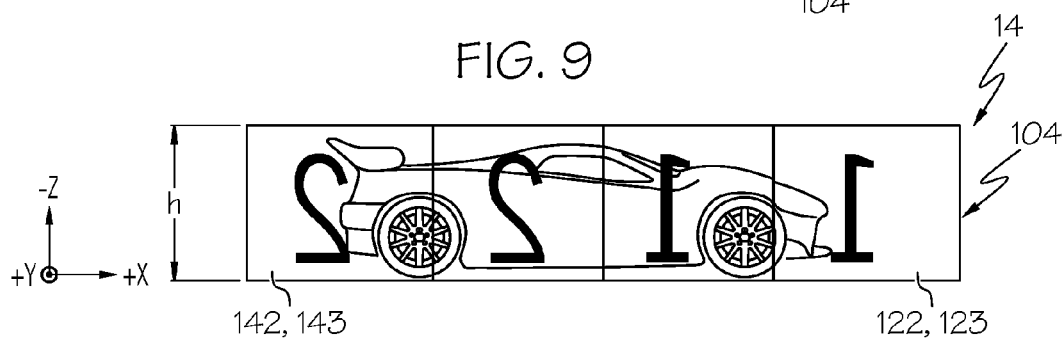
FIG. 10 schematically depicts a side view of the cloaking device shown in FIG. 9.

Referring to FIGS. 1-10, embodiments of a cloaking device with a cloaking assembly 14 having items in the form of '1', '2', '3', '4' adjacent to the outer end surfaces 126, 146, 116, 136, respectively are shown in FIG. 9. FIG. 10 is a side view of the cloaking assembly 14 illustrated in FIG. 9 with reversed images of item 1 and item 2, in conjunction with the image of the automobile A, visible on the image-side 104 of the cloaking assembly 14. It should be appreciated that items 1, 2, 3, 4 depicted in FIGS. 9-10 are shown for illustrative purposes only, i.e. the items 1, 2 in FIG. 9 could be oriented in the Y-Z plane in order to provide reverse images of items 1, 2 on the image side 104 (X-Z plane) in FIG. 10. It should also be appreciated that reverse images of item 3 and item 4 can be formed or provided on the object-side 102 of the cloaking assembly 14 in a similar manner as the reversed images of item 1 and item 2 are formed on the image-side 104.

Figure 11:
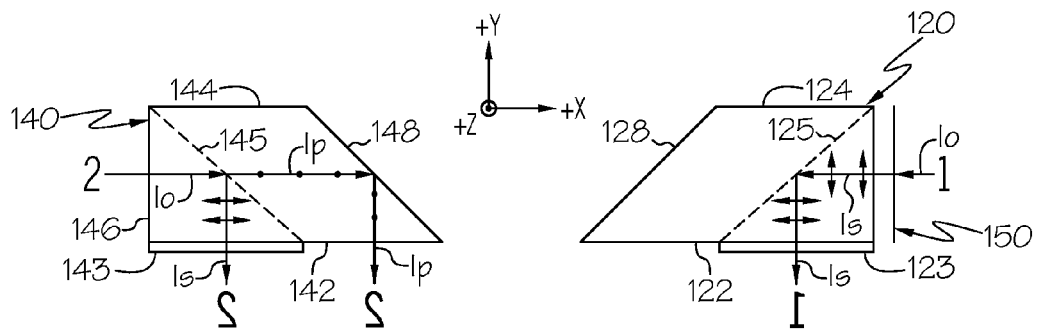
FIG. 11 schematically depicts a top isolated view of two cloaking device components according to one or more embodiments described and illustrated herein.

Referring to FIGS. 1-8 and 11, embodiments of a cloaking device that can selectively display images in conjunction with the images depicted in FIGS. 1, 4, 5 and 7 are shown. Particularly, FIG. 11 shows an item in the form of the number '1' and an item in the form of the number '2' located adjacent to the outer end surfaces 126, 146, respectively, in the +X, −X directions, respectively. Light lo from item 1 is incident on an s-polarizer 150. The s-polarizer 150 allows the s-mode ls of the incident light lo to pass through in the −X direction. The s-polarized light ls is incident on and reflected by the p-polarization half mirror 125 into the −Y direction and no light is transmitted through or beyond the p-polarization half mirror 125 in the −X direction. Accordingly, a reversed image of item 1 is formed only on the right hand side of the outward facing surface 122. The light lo from item 2 is transmitted through the outer end surface 146 in the +X direction and is incident on the p-polarization half mirror 145. The p-polarization half mirror 145 transmits the p-mode lp of the incident light lo in the +X direction and reflects the s-mode ls of the incident light lo in the −Y direction. The p-polarized light lp in the +X direction is incident on the outward facing mirror surface 148a. The outer facing mirror surface 148a reflects the incident p-polarized light lp in the −Y direction. The s-polarized light ls reflected by the half mirror 145 in the −Y direction forms a reversed item 2 image on the left hand side of the outer facing surface 142. The p-polarized light lp reflected by the outer facing mirror surface 148a into the −Y direction provides a reversed item 2 image on the right hand side of the outer facing surface 142.

Figure 12:
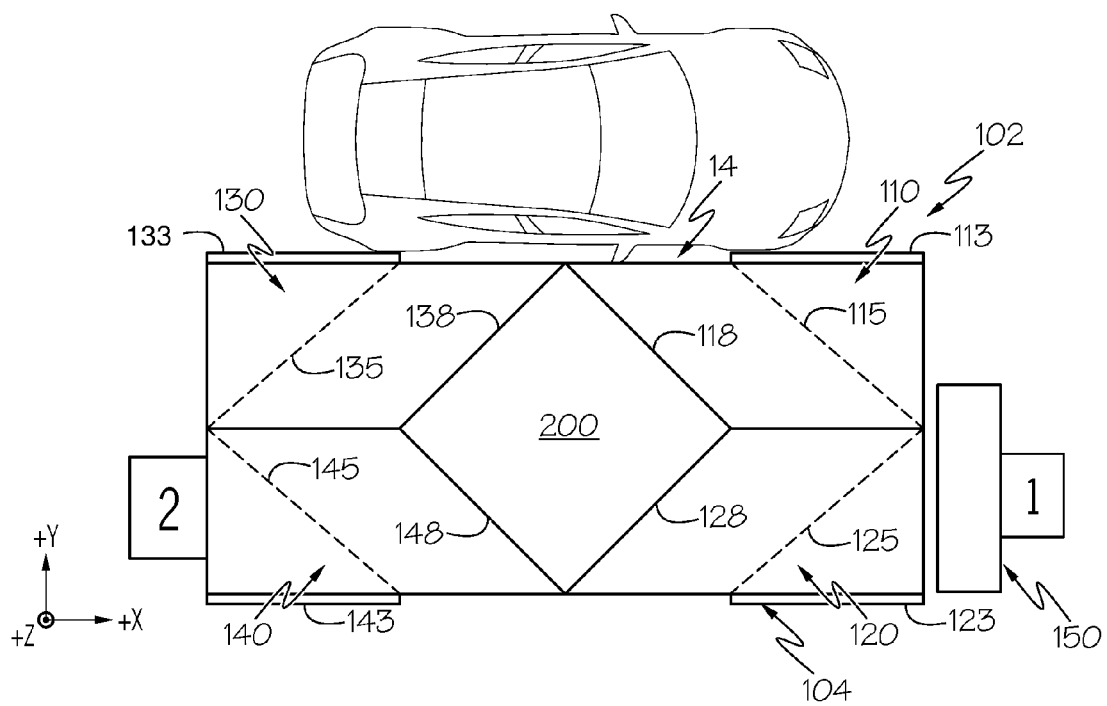
FIG. 12 schematically depicts a top view of a cloaking device with four cloaking device components according to one or more embodiments described and illustrated herein.
Figure 13:
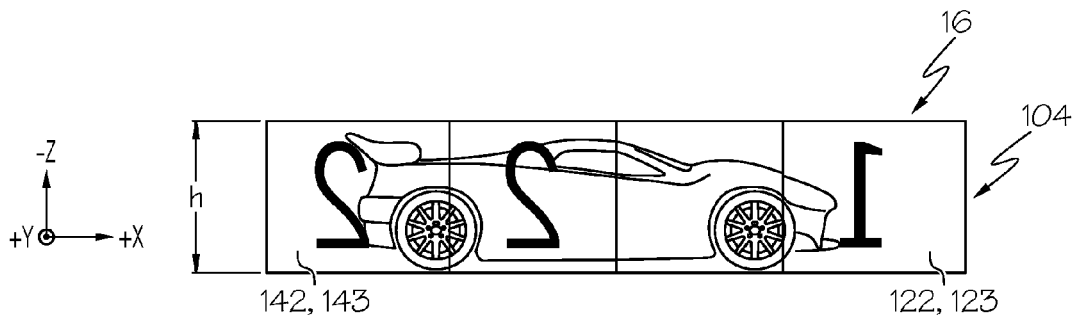
FIG. 13 schematically depicts a side view of the cloaking device of FIG. 12.

Referring to FIGS. 1-8 and 11-13, embodiments of a cloaking device with a cloaking assembly 16 having items in the form of '1' and '2' adjacent to the outer end surfaces 126, 146, respectively, and the s-polarizer 150 adjacent the outer end surface 126, are shown in FIG. 12. FIG. 13 is a side view of the cloaking assembly 16 illustrated in FIG. 12 with the reversed image of item 1 visible on the right hand side of the outer facing surface 122 of the cloaking assembly component 120 and the reversed image of item 2 visible on the left hand side and right hand side of the outward facing surface 142 of the cloaking assembly components 140 shown in conjunction with the image of the automobile A. It should be appreciated that items 1, 2 depicted in FIG. 12 are shown for illustrative purposes only, i.e. the items 1, 2 in FIG. 12 could be oriented in the Y-Z plane in order to provide the reverse images of items 1, 2 on the image-side (104) (X-Z plane) shown in FIG. 13.

Figure 14:
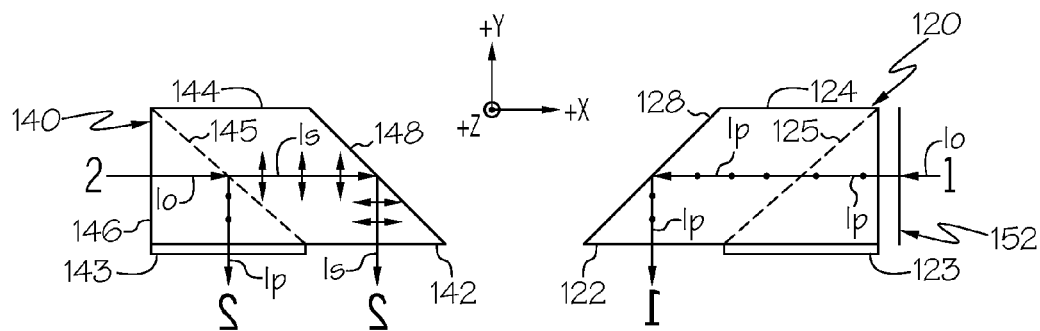
FIG. 14 schematically depicts a top isolated view of two cloaking device components according to one or more embodiments described and illustrated herein.

Referring to FIGS. 1-8 and 14, another embodiment of a cloaking device that can selectively display additional images in conjunction with the images depicted in FIGS. 1, 4, 5 and 7 is shown. Particularly, FIG. 14 shows an item in the form of the number '1' and an item in the form of the number '2' located adjacent to the outer end surfaces 126, 146, respectively, in the +X, −X directions, respectively. Light lo reflected from the item 1 is incident on a p-polarizer 152 which allows p-polarized light lp to pass through in the −X direction. The p-polarized light lp is incident on the p-polarization half mirror 125. The incident p-polarized light lp in the −X direction is transmitted through the p-polarization half mirror 125 in the −X direction and there is no s-polarized light ls to be reflected by the p-polarization half mirror 125 in the −Y direction. The p-polarized light lp transmitted through the p-polarization half mirror 125 is incident on the outward facing mirror surface 128a and the outward facing mirror surface 128a reflects the p-polarized light lp into the −Y direction. Accordingly, a reversed image of item 1 is formed only on the left hand side of the outward facing surface 122. The light lo reflected from item 2 is transmitted through the outer end surface 146 in the +X direction and is incident on the p-polarization half mirror 145. The p-polarization half mirror 145 transmits the p-mode lp of the incident light lo in the +X directions and reflects the s-mode ls of the incident light lo into the −Y direction. The p-polarized light lp in the +X is incident on the outer facing mirror surface 148a. The outer facing mirror surface 148a reflects the incident p-polarized light lp into the −Y direction. The s-polarized light is reflected by the half mirror 145 in the −Y direction forms a reversed 2 on the left hand side of the outer facing surface 142 and the p-polarized light lp reflected by the outer facing mirror surface 148a in the −Y direction forms a reversed 2 image on the right hand side of the outer facing surface 142.

Figure 15:
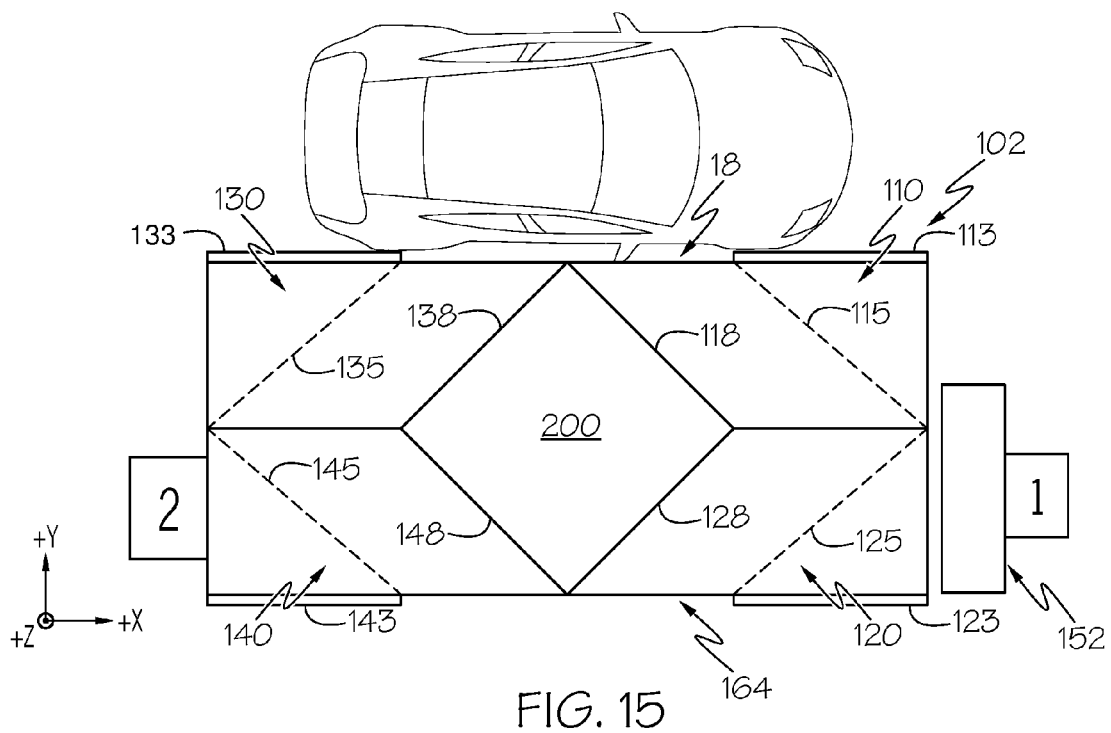
FIG. 15 schematically depicts a top view of four cloaking device components according to one or more embodiments described and illustrated herein.
Figure 16:
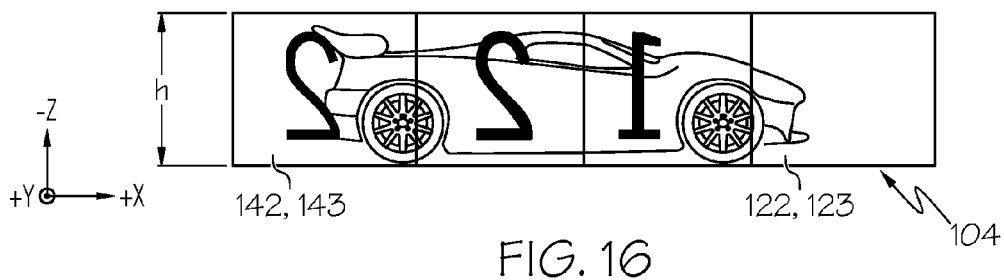
FIG. 16 schematically depicts a side view of the cloaking device of FIG. 15.

Referring to FIGS. 1-8 and 14-16, embodiments of a cloaking device with a cloaking assembly 18 having items 1 and items 2 adjacent to the outer end surfaces 126, 146, respectively, and the p-polarizer 152 adjacent to the outer end surface 126, are shown in FIG. 15. FIG. 16 is a side view of the cloaking assembly 18 illustrated in FIG. 15 with the single reversed image of item 1 visible on the left hand side of the outer facing surface 122 of the cloaking assembly component 120 and the reversed image of item 2 visible on the left hand side and right hand side of the outward facing surface 142 of the cloaking assembly components 140 in conjunction with the image of the automobile A. It should be appreciated that items 1, 2 depicted in FIG. 15 are shown for illustrative purposes only, i.e. the items 1, 2 in FIG. 15 could be oriented in the Y-Z plane in order to provide the reverse images of items 1, 2 on the image-side 104 (X-Z plane) shown in FIG. 16.

Figure 17:
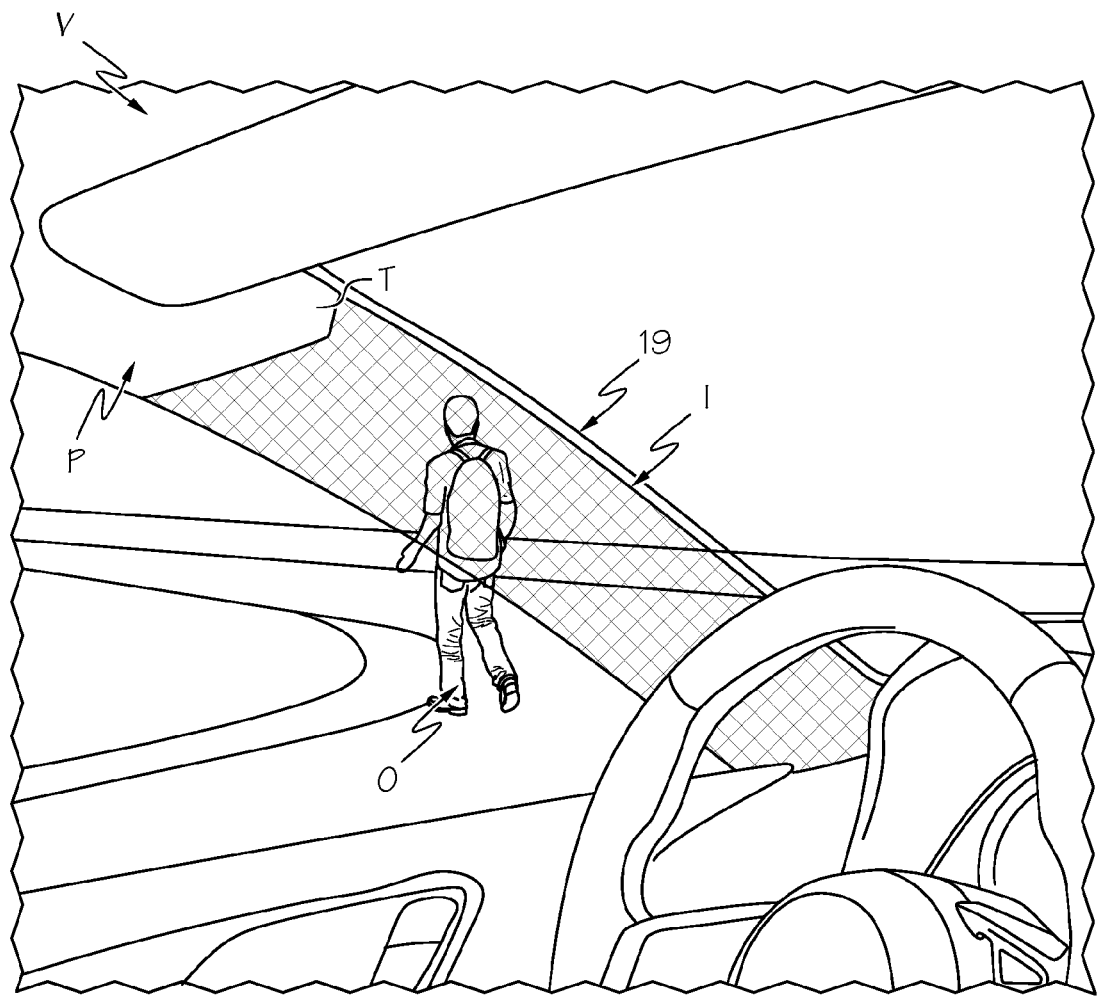
FIG. 17 schematically depicts a side view of a cloaking device cloaking an A-pillar of a vehicle according to one or more embodiments described and illustrated herein.

Referring to FIGS. 1, 2, 5, 8-17, embodiments of an A-pillar of a vehicle being cloaked by a cloaking device are shown. Particularly, FIG. 17 shows a cloaking device 19 cloaking a portion of an A-pillar P of a vehicle V. A portion of the A-pillar P is positioned within a CR 200 (not shown) of the cloaking device 19 and a portion of the A-pillar P extends beyond the cloaking device and is covered with trim T. Illustrated outside of the vehicle V is a target object O in the form of pedestrian. A portion of the pedestrian O is visible through a side window of the vehicle V and a portion of the pedestrian is visible "through" the A-pillar P cloaked by the cloaking device 19. The cloaking device 19 redirects light reflected from the pedestrian O around the A-pillar P positioned within the CR 200 of the cloaking device 19 and forms an image I of the pedestrian O on an image-side 104 of the cloaking device 19 that is visible to an occupant of the vehicle V looking towards the pedestrian O. Accordingly, light from the pedestrian O appears to pass through the A-pillar P and a blind spot typically created by the A-pillar P is not as present as when the portion of the A-pillar P is not positioned within the CR 200 of the cloaking device 19. In embodiments, the A-pillar P itself serves as the CR 200, i.e. the A-pillar P has an outer surface with one or more outer facing mirror surfaces that assist in redirecting light from the pedestrian) around the A-pillar P. It should be appreciated that cloaking of the A-pillar P with the cloaking device 19 and removing the blind spot produced by the A-pillar P is performed without the use of metamaterials, video images, cameras, sophisticated electronics, etc.

The cloaking devices described herein may be used to cloak vehicle articles such as a vehicle A-pillar, B-pillar, C-pillar, D-pillar, etc., and remove a "blind spot" caused by the vehicle article. It will be understood that the term "blind spot" as used herein refers to an area around the vehicle that cannot be directly observed by a driver while operating the vehicle. The terms "object," "article," and "item" may interchangeably refer to a visual object or image (2D or 3D) that reflects light or transmits light and the term "light from" may refer to "light reflected from" or "light transmitted from." The terms "generally," "approximately," and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A cloaking device comprising:
   an object-side and an image-side;
   a cloaking region (CR) boundary plane having an outward facing mirror surface and an inward facing opaque surface;
   a CR at least partially bounded by the inward facing opaque surface of the CR boundary plane;
   a half mirror spaced apart and generally parallel to the outward facing mirror surface;
   a first matching medium positioned between the object-side and the image-side;
   a first optical path from an object positioned on the object-side of the cloaking device and obscured by the CR to an image of the object on the image-side; and
   a second optical path from the object positioned on the object-side of the cloaking device and not obscured by the CR to the image of the object on the image-side;
   wherein:
   the first optical path has a first optical path length and the second optical path has a second optical path length;
   the first matching medium is positioned in the second optical path alters the second optical path length such that an optical path difference between the first optical path length and the second optical path length is altered.

2. The cloaking device of claim 1, further comprising a second matching medium positioned between the object-side and the image-side in the second optical path.

3. The cloaking device of claim 2, wherein the first matching medium is positioned on the object-side and the second matching medium is positioned on the image-side of the cloaking device.

4. The cloaking device of claim 1, wherein the half mirror is selected from a p-polarization half mirror and an s-polarization half mirror.

5. The cloaking device of claim 1, further comprising:
   at least two CR boundary planes positioned non-planar to each other, each of the at least two CR boundary planes having an outward facing mirror surface and an inward facing opaque surface, the CR at least partially bounded by the inward facing opaque surfaces of the at least two CR boundary planes;
   at least one quarter-wave plate positioned on or adjacent to the image side; and
   at least two half mirrors spaced apart and generally parallel to the outward facing mirror surfaces such that one of the at least two half mirrors is spaced apart and generally parallel to each outward facing mirror surface;
   a pair of first matching mediums positioned between the object side and the image side;
   a pair of first optical paths from the object positioned on the object-side of the cloaking device and obscured by the CR to the image of the object on the image-side; and
   a pair of second optical paths from the object positioned on the object-side of the cloaking device and not obscured by the CR to the image of the object on the image-side;
   wherein:
   the pair of first optical paths each have the first optical path length and the pair of second optical paths each have a second optical path length;

the pair of first matching mediums are positioned in the pair of second optical paths such that one of the pair of first matching mediums is positioned in each of the pair of second optical paths and increases the second optical path length such that the optical path difference between the first optical path length and the second optical path length is reduced.

6. The cloaking device of claim 5, wherein the at least two CR boundary planes are positioned orthogonal to each other.

7. The cloaking device of claim 6, wherein light from the object on the object-side of the cloaking device is reflected by a first outward facing mirror surface, a first half mirror positioned parallel to the first outward facing mirror surface, a second half mirror positioned orthogonal to the first half mirror, a second outward facing mirror surface positioned parallel to the second half mirror, and transmitted through the at least one quarter-wave plate before forming the image of the object on the image-side of the cloaking device.

8. The cloaking device of claim 7, further comprising a pair of second matching mediums positioned between the object-side and the image-side in the pair of second optical paths such that one of the second matching mediums is positioned in each of the pair of second optical paths.

9. The cloaking device of claim 5, further comprising an end side, wherein light from an item positioned adjacent to the end side forms the image of the item on the image-side of the cloaking device.

10. A cloaking device for cloaking an article of a vehicle comprising:
a cloaking assembly comprising:
an object-side and an image-side;
at least two CR boundary planes located at least partially between the object-side and the image-side, the at least two CR boundary planes positioned non-planar to each other and each of the at least two CR boundary planes having an outward facing mirror surface and an inward facing opaque surface;
a CR bounded by the inward facing opaque surfaces of the at least two CR boundary planes;
a vehicle article positioned within the CR;
at least two half mirrors located at least partially between the object-side and the image-side, each of the at least two half mirrors spaced apart and generally parallel to one of the outward facing mirror surfaces such that a half mirror is spaced apart and generally parallel to each outward facing mirror surface;
at least one quarter-wave plate positioned on or adjacent to the image-side;
at least two first matching mediums positioned between the object-side and the image-side;
at least two first optical paths from an object positioned on the object-side of the cloaking device and obscured by the CR to an image of the object on the image-side; and
at least two second optical paths from the object positioned on the object-side of the cloaking device and not obscured by the CR to the image of the object on the image-side;
wherein:
the at least two first optical paths each have a first optical path length and the at least two second optical paths each have a second optical path length;
the at least two first matching mediums are positioned in the at least two second optical paths such that one of the at least two first matching mediums is positioned in each second optical paths and increases the second optical path length of the at least two second optical paths such that an optical path difference between the first optical path length and the second optical path length is reduced;
light from the object located on the object-side of the cloaking assembly and obscured by the CR is redirected around the CR and forms the image of the object on the image-side of the cloaking assembly such that the vehicle article appears to be transparent.

11. The cloaking device of claim 10, wherein the vehicle article is selected from the group consisting of a vehicle A-pillar, a vehicle B-pillar and a vehicle C-pillar.

12. The cloaking device of claim 10, wherein the light from the object is reflected by a first outward facing mirror surface, a first half mirror oriented generally parallel to the first outward facing mirror surface, a second half mirror oriented generally orthogonal to the first half mirror and a second outward facing mirror surface oriented generally parallel to the second half mirror and transmitted through the at least one quarter-wave plate before forming the image on the image-side of the cloaking assembly.

13. The cloaking device of claim 12, further comprising an end surface, wherein light from an item located adjacent to the end surface passes through the cloaking assembly and forms the image of the item on the image-side of the cloaking assembly.

14. The cloaking device of claim 13, wherein a p-mode or an s-mode of the light from the item is reflected from the second half mirror before forming the image of the item on the image-side of the cloaking assembly.

15. The cloaking device of claim 13, wherein a p-mode or an s-mode of the light from the item is transmitted through the second half mirror and reflected by the second outward facing mirror surface before forming the image of the item on the image-side of the cloaking assembly.

16. The cloaking device of claim 9, further comprising at least two second matching mediums positioned between the object-side and the image-side in the at least two second optical paths such that one of the at least two second matching mediums is positioned in each of the at least two second optical paths.

17. A cloaking device comprising:
an object-side and an image-side;
four CR boundary planes positioned non-planar to each other, each of the four CR boundary planes having an outward facing mirror surface and an inward facing opaque surface;
a CR bounded by the inward facing opaque surfaces of the four CR boundary planes;
an article located at least partially within the CR;
four half mirrors spaced apart and generally parallel to the outward facing mirror surfaces such that a half mirror is spaced apart and generally parallel to each outward facing mirror surface;
a first matching medium positioned between the object-side and the image-side;
a first optical path from an object positioned on the object-side of the cloaking device and obscured by the CR to an image of the object on the image-side; and
a second optical path from the object positioned on the object-side of the cloaking device and not obscured by the CR to the image of the object on the image-side;
wherein:
the first optical path has a first optical path length and the second optical path has a second optical path length;
the first matching medium is positioned in the second optical path and increases the second optical path length such that an optical path difference between the first optical path length and the second optical path length is reduced;

light from the object on the object-side of the cloaking device is redirected around the CR and appears as the image on the image-side of the cloaking device and is visible to an observer viewing the image-side of the cloaking device and the article within the CR is not visible to the observer viewing the image-side of the cloaking device such that the article within the CR appears transparent to the observer viewing the image-side of the cloaking device.

18. The cloaking device of claim 17, wherein the light from the object is reflected by a first outward facing mirror surface, a first half mirror oriented generally parallel to the first outward facing mirror surface, a second half mirror oriented generally orthogonal to the first half mirror and a second outward facing mirror surface oriented generally parallel to the second half mirror before forming the image on the image-side of the cloaking device.

19. The cloaking device of claim 17, further comprising:
at least two first matching mediums positioned between the object-side and the image-side;
at least two first optical paths from the object positioned on the object-side of the cloaking device and obscured by the CR to the image of the object on the image-side; and
at least two second optical paths from the object positioned on the object-side of the cloaking device and not obscured by the CR to the image of the object on the image-side;

wherein:
the at least two first optical paths each have the first optical path length and the at least two second optical paths each have a second optical path length;
the at least two first matching mediums are positioned in the at least two second optical paths such that one of the at least two first matching mediums is positioned in each second optical paths.

20. The cloaking device of claim 19, wherein one of the at least two first matching mediums is positioned on the object-side and one of the at least two first matching mediums is positioned on the image-side of the cloaking device.

* * * * *

UNITED STATES PATENT AND TRADEMARK OFFICE
CERTIFICATE OF CORRECTION

PATENT NO.       : 9,994,154 B1
APPLICATION NO.  : 15/423170
DATED            : June 12, 2018
INVENTOR(S)      : Mayu Takagi and Debasish Banerjee Page 1 of 1

It is certified that error appears in the above-identified patent and that said Letters Patent is hereby corrected as shown below:

In the Specification

In Column 12, Lines 7-8, delete "image T" and insert --image 'I'--, therefor.

Signed and Sealed this
Fourteenth Day of August, 2018

Andrei Iancu
*Director of the United States Patent and Trademark Office*